J. M. & E. INGOLD.
Carriage-Spring.
No. 62,543. Patented Mar 5, 1867.
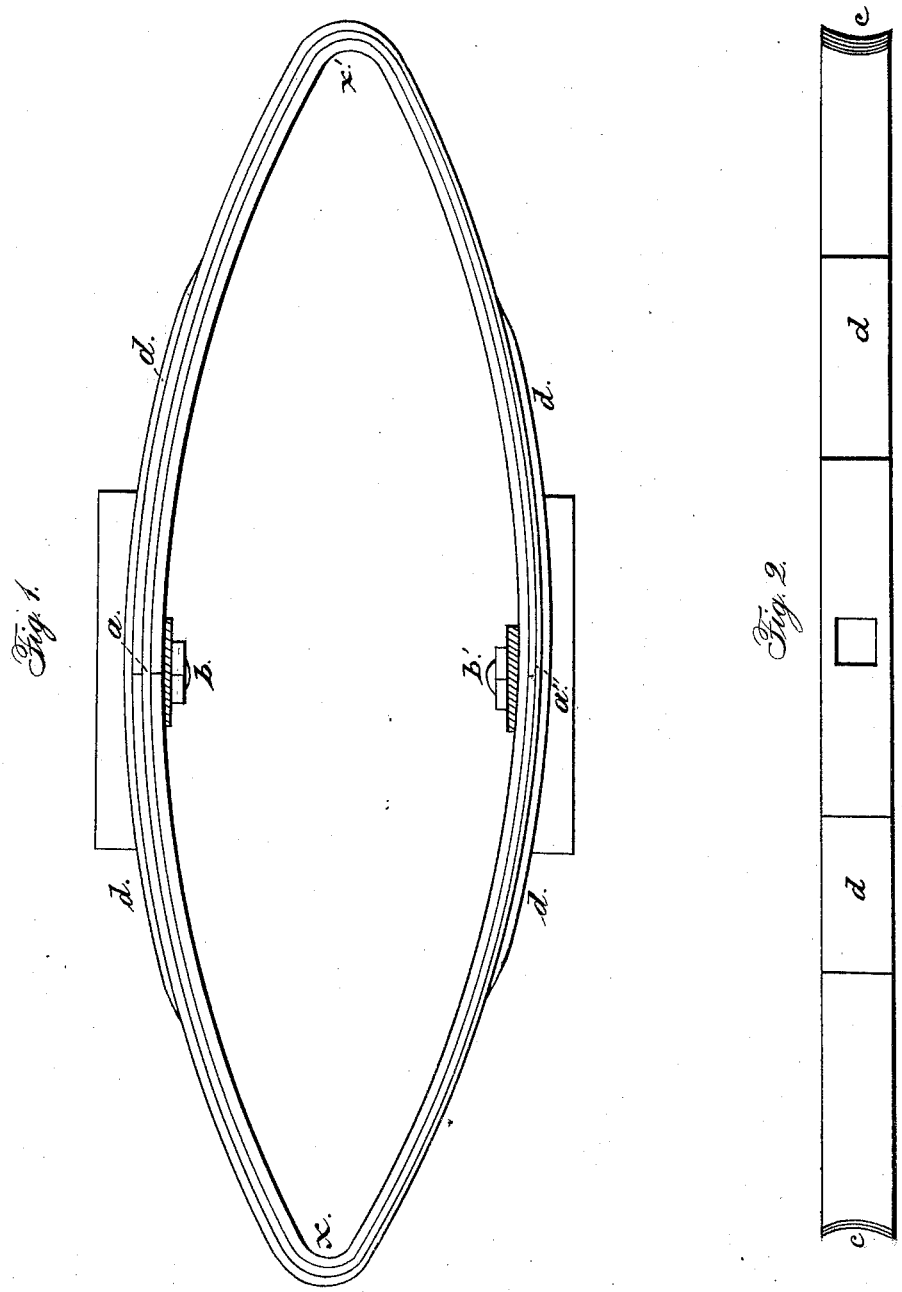
Witnesses:
Allan C. Bakewell
W D Lewis
Inventor:
John M. Ingold
Eugene Ingold
by their Attorneys
Bakewell & Christy.

United States Patent Office.

JOHN M. AND EUGENE INGOLD, OF ALLEGHENY, PENNSYLVANIA.

*Letters Patent No. 62,543, dated March 5, 1867.*

IMPROVEMENT IN SPRINGS FOR CARRIAGES.

*The Schedule referred to in these Letters Patent and making part of the same.*

TO ALL WHOM IT MAY CONCERN:

Be it known that we, JOHN M. INGOLD and EUGENE INGOLD, of the city of Allegheny, in the county of Allegheny, and State of Pennsylvania, have invented a new and useful Improvement in Springs for Carriages and other Vehicles; and we do hereby declare the following to be a full, clear, and exact description thereof, reference being had to the accompanying drawings, making a part of this specification, in which—

Figure 1 is a front view of the spring; and

Figure 2 is a top or vertical view—

And to the letters of reference marked thereon.

The nature of our invention consists in making steel springs for carriages and other vehicles of a leaf or leaves of steel of elliptical or ellipsoidal form, bent round at the extremities of the major axis of the ellipse, so as to have no break or joint at those points, the extremities of each plate or leaf being held together by a band, or other device, so as to avoid the necessity of welding, by which means we secure a greatly increased elasticity and strength with the same weight of metal. It has been the practice heretofore, where springs have been made without a joint at the extremities of the major axis of the ellipse or ellipsoid, to weld the leaves together so as to form one continuous piece. This, however, does not make so good a spring as ours, and the welding burns the steel and injures it very materially. When springs are made of more than one leaf the joint or point of contact of the extremities of the spring is covered by the next leaf above and below it, a spring thus made being as firm and strong and more elastic than when the ends of the leaves are welded together.

To enable others skilled in the art to make and use our invention, we will proceed to describe its construction and operation.

From steel bars or plates, manufactured by any known method, we cut the leaves of the spring, usually to a length equal to the entire periphery of the spring to be manufactured, increasing the length as may be necessary for the outer leaves, where the opening is made of more than one leaf. When thus cut we bend them, either hot or cold, usually the former, by any known device, to a shape approximating closely to that of an ellipse, as represented in fig. 1, but vary therefrom slightly, (still retaining the elliptic figure,) if experience so dictates. After bending, we temper them, or leave them untempered, according to the use for which they are designed. If but a single-leaf spring is desired, we bring the two ends of the leaf together at or near either extremity of the minor axis $a\ a'$ of the elliptic figure so made, and secure the spring thus bent in its proper position by bolts, $b\ b'$, or straps, clips, or other equivalent mechanical device. If two or more leaves are required, we make the two ends of one leaf meet at or near one end of the minor axis of the ellipse, $a$ or $a'$, and the two ends of the next leaf at the other end, $a'$ or $a$, and so "breaking joints" or alternating till the requisite number of leaves are in place. They are then fastened and connected to the carriage, or other vehicle, as above described, by straps, screw-bands, or by bolts, $b\ b'$, passing through holes in the middle of such leaves, or "half-holes," or segments, equal to one-half a circle of corresponding diameter made in the ends, or by other equivalent device. Hot steel bars, when thus bent, usually have a concave surface, $c\ c$, on the outer face of the curve. This concave surface, when leaves so bent are placed one without the other, prevents them from slipping on each other in a horizontal plane parallel with the major axis of the ellipse, thus accomplishing the object now secured by the bolt, scroll, head, etc., at the ends of the ordinary carriage-springs, without the expense of heading, turning, ribbing, etc. When necessary or desirable we strengthen the spring as thus constructed with leaves, $d\ d$, similar to those now in use, placed one or more above or under the spring. This spring is available for all uses to which elliptic springs usually are or can be applied, in all wagons, carriages, cars, or other vehicles, under seats to mowing and reaping machines, etc. To make them available for railroad cars, we place them—having first made them with leaves of any desirable number, weight, or size—two or more, side by side, and fasten them in position by screw-bands, straps, etc., passing over, under, around, or through the springs so made, and placed at or near the extremities of the minor axis $a\ a$, instead of, as now, by bolts at the extremities of the major axis, $x\ x$.

We do not wish to limit ourselves in all cases to the use of leaves equal in length to the entire periphery of the spring. Bars of half that length, and meeting, joined or welded at or near both ends of the minor axis $a\ a$, are available in the manufacture of springs such as we have described, and we sometimes use them for that purpose.

We are aware that elliptic steel carriage springs, jointed or welded, or made with bolt, scroll, etc., at the extremity of the major axis, have long been in general use, and that circular steel springs of a single continuous leaf are already secured to the inventors thereof by Letters Patent; but what we claim as our invention, and desire to secure by Letters Patent, is—

1. Making elliptic or ellipsoidal springs of one or more leaf or leaves, each leaf extending all around the spring until its extremities nearly or quite touch each other, so as to form an unbroken curve around the extremities of the major axis of the ellipse, and thus dispense with the welding of the leaf or leaves, substantially as hereinbefore described.

2. The arrangement of the leaves of an elliptical or ellipsoidal spring, consisting of two or more leaves, and constructed, as hereinbefore described, without welding, so that the joint at the extremities of each leaf of the spring shall be lapped or covered by the next contiguous leaf of the spring, the joints of the leaves being alternately placed at or near one or other of the extremities of the inner axis of the ellipse, substantially as and for the purposes hereinbefore described.

In testimony whereof the said JOHN M. INGOLD and EUGENE INGOLD have hereunto set their hands in the presence of us—

JOHN M. INGOLD,
EUGENE INGOLD.

Witnesses:
ALEXANDER HAYS,
WILLIAM LONGDEN.